United States Patent [19]

Lee

[11] Patent Number: 4,918,557

[45] Date of Patent: Apr. 17, 1990

[54] CLEANER FOR MAGNETIC HEAD OF TAPE RECORDER

[76] Inventor: Benjamin Lee, 2F, 87Shu Hsin Road, Su Lin Town, Taipei Hsien, Taiwan

[21] Appl. No.: 220,537

[22] Filed: Jul. 18, 1988

[51] Int. Cl.⁴ .............................................. G11B 5/41
[52] U.S. Cl. ................................................... 360/128
[58] Field of Search ......................................... 360/128

[56] References Cited

U.S. PATENT DOCUMENTS

| | | | |
|---|---|---|---|
| 4,149,206 | 4/1979 | Loiselle | 360/128 |
| 4,594,629 | 6/1986 | d'Arc | 360/128 |
| 4,670,808 | 6/1987 | Moesgaard | 360/128 |
| 4,698,712 | 10/1987 | Fritsch | 360/128 |
| 4,713,712 | 12/1987 | Chou | 360/128 |

FOREIGN PATENT DOCUMENTS 58-6520 1/1983 Japan .................................. 360/128

Primary Examiner—John H. Wolff
Attorney, Agent, or Firm—Lilling & Greenspan

[57] ABSTRACT

A cleaner for magnetic heads of tape recorders includes two gears centrally engaged with the revolving shaft of the recorder during use and pivotally installed in two revolving shaft holes on the tape cartridge respectively and peripherally engaged with each other. A plurality of projecting posts are spaced equally along the circumference in the planes of the two gears and alternately disposed in respect of each other post. A rocker is centrally and pivotally installed nearby the front end of tape recorder and between the two gears. Two opposite contact legs are provided to the rear end of the rocker and projected toward these posts respectively so as to contact these post alternately and respectively, and a cleaning element is installed on the front of the rocker. When this cleaner is installed in the tape recorder for use, the two gears rotate synchronously in opposite directions, the posts push and swing the rocker left and right alternately and respectively in sequence, so the rocker swings left and right and the cleaning element of the front end of rocker can clean the magnetic head of the recorder.

9 Claims, 2 Drawing Sheets

CLEANER FOR MAGNETIC HEAD OF TAPE RECORDER

BACKGROUND OF THE INVENTION

1. Field of the Invention

The present invention is related to a novel structure for a cleaner for magnetic heads of tape recorders which can automatically clean such elements as sound-recording magnetic heads, erasing heads, clamping rollers and rotating pins.

2. Description of the Prior Art

Various magnetic heads of tape recorders have to be diligently maintained and cleaned so as to keep their quality in good condition and extend their life expectancy. Since such elements as the magnetic heads, erasing heads or clamping rollers of tape recorder are disposed in covert positions in the tape recorder and their structures are rather compact, they are customarily cleaned by means of mannually bedewing cotton with liquid detergent. Such a cleaning method is rather inconvenient and time-wasting. In view of the above, various structures or devices for automatically cleaning the magnetic head of tape recorder have been invented. The present invention offers a novel structure for a cleaner for magnetic heads of tape recorders.

SUMMARY OF THE INVENTION

The two gears centrally engaged with the revolving shaft of tape recorder during use is pivotally installed respectively in two revolving shaft holes on the tape cartridge of the present invention. These two gears are peripherally engaged with each other. The planes of these two gears are provided respectively with a plurality of projecting posts spaced equally along the circumference of said gears and alternately disposed in respect of each other post. A rocker is pivotally installed respectively nearby the front end of said cartridge and between said two gears. Two opposite contact legs are provided to the rear end of said rocker toward said projecting posts to contact these posts alternately and respectively. A cleaning element is provided to the front end of said rocker. When the cleaner of the present invention is installed in the tape recorder for use, the gears may be driven by the revolving shaft of a tape recorder to rotate. The projecting posts on these gears will follow to rotate toward each other. Since the said posts on the gears are disposed alternately toward each other, the left and right contact legs of said rocker are pushed by these posts toward left and right alternatively in sequence, and said rocker swings left and right in respect of its own pivotal joint, so the cleaning element installed at the front end of said rocker can repeatedly and continuously move to clean the elements of tape recorders such as the magnetic heads.

DETAILED DESCRIPTION OF THE PREFERRED EMBODIMENTS

Figure 1:
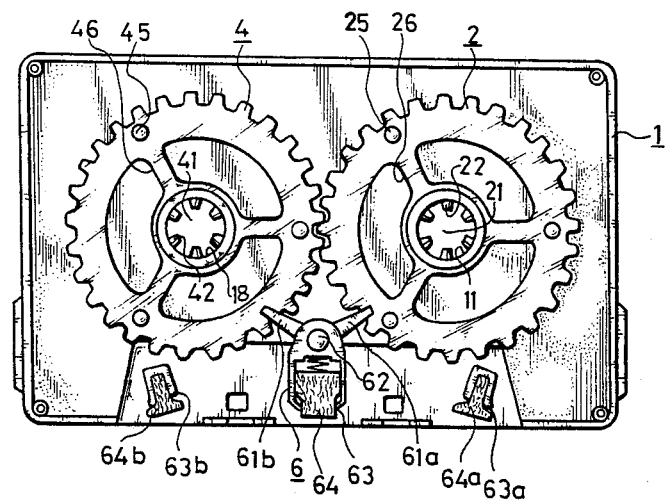
FIG. 1 is a plan view of the present invention.

The structure, characteristics and function of the present invention can be best described in detail in conjunction with the accompanying drawings showing the examples thereof as follows:

As shown in FIG. 1, the two revolving shaft holes (11) (18) of tape cartridge (1) are respectively provided with gears (2) (4) which engage with each other. The structure of these two gears is entirely the same and provided with a center hole (21) (41) respectively, and a plurality of projecting teeth (22) (42) are provided to the center hole (21) (41) to engage with the revolving shaft of a tape recorder to rotate during use. A plurality of projecting posts (25) (45) (three projecting posts are provided on each gear in this example) which project to one side of the plane of these gears (2) (4) along the circumference of the gears, and the posts on each gear are alternately disposed with respect to the posts on the other gear. These posts are integrated with the gears, so when these gears rotates, these posts follow to rotate at the same time.

The present invention is provided with a rocker (6) of which the central portion is pivotally installed nearby the front end of tape cartridge (1) and between the two gears (2) (4). Two opposite contact legs (61a) (61b) are provided at the rear end (inner end) of the rocker toward the projecting posts to contact these posts alternately and respectively in sequence; and the front end of the rocker is provided with a cleaning element. When the two contact legs (61a) (61b) are pushed by these posts (25) (45) to swing left and right, the rocker in respect of its pivotal joint (62) will let the cleaning element at the front end thereof swing left and right, too, so as to clean such elements as the magnetic heads of tape recorders. The cleaning element at the front end of the rocker may have any pattern. For instance, as shown in FIG. 1, a groove (63) at the front end of the rocker is designed to insert the cleaning cotton (64) therein, and the grooves (63a) (63b) on the two sides of tape cartridge (1) are used to insert the cleaning cotton (64a) (64b) respectively.

In the use of the present invention, the cartridge (1) is put into the tape recorder and the push button "play" is pressed down so as to rotate the revolving shaft of said recorder. This is similar to loading the tape cartridge conventionally. Since the two gears (2) (4) of the present invention engage with each other, any one gear driven by either revolving shaft of the tape recorder can make these two gears rotate synchronously in opposite directions. (When the tape recorder is used, only one revolving shaft drives and another revolving shaft transmits.) At the same time, the projecting posts (25) (45) on these two gears rotate toward each other. Since a plurality of projecting posts on these two gears are disposed alternately toward each other, when these two gears rotate synchronously in opposite directions, the projecting posts (25) (45) thereon push and swing the contact legs (61a) (61b) left and right respectively and alternately in sequence so as to swing the rocker (6) as a whole left and right in respect of its pivotal joint. The cleaning cotton (64) installed in the groove (63) at the front end of rocker (6) can clean the sound-recording magnetic head of a tape recorder and at the same time, the cleaning cotton (64b) installed on the left side of the tape cartridge (1) can clean the erasing head, and the cleaning cotton (64a) installed on the right side thereof can clean the clamping roller and rotating pin of tape recorder.

The projecting posts (25) (45) are vertically installed on the surface of the gears (2) (4), so except for the required ribs (26) (46) for connection, other portions of the gears may be hollow; and even the posts contact the surface of tape cartridge, it is only a point contact, so the operation thereof is convenient and smooth. The number of posts is not to be limited to any specific numbers. However, it is understood that the greater the number of posts, the quicker the speed of rocker (6) swings left and right.

Figure 2:
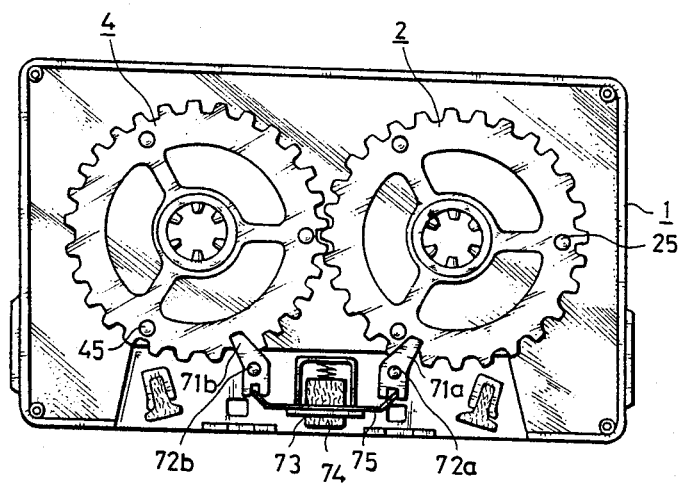
FIG. 2 is a plan view of another example of rocker of the present invention.

FIG. 2 shows another example of a rocker of the present invention wherein the two ends of a sliding plate (75) are respectively disposed in the recesses of two contact legs (71a) (71b) pivotally installed on the tape cartridge (1), the inner ends of these two contact legs project toward the projecting posts (25) (45) on the two gears and contact these posts alternately and respectively. The groove (73) at the front end of sliding plate (75) is designed to receive the cleaning cotton (74). During use, the alternately disposed posts (25) (45) on the synchronously rotated gears (2) (4) in opposite directions and swing the two contact legs (71a) (71b) of rocker (7) left and right alternately and respectively so that the rocker (7) as a whole moves left and right in respect of the pivotal joint of said two contact legs, and the cleaning cotton installed at the front end of sliding plate (75) of said rocker (7) can clean the magnetic head of tape recorder.

Figure 3:
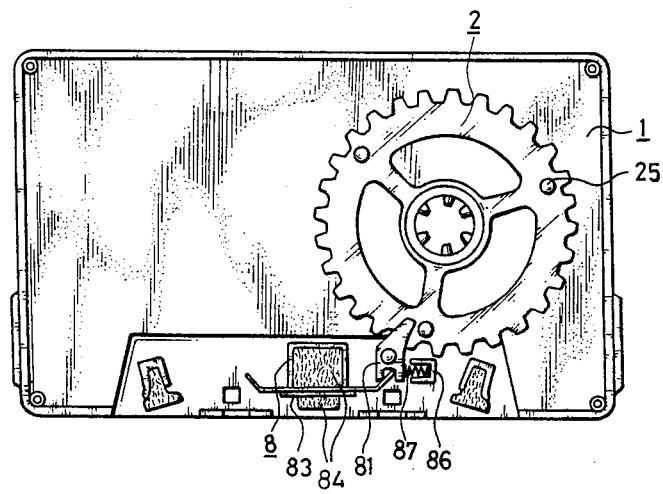
FIG. 3 is a plan view of still another example of rocker of the present invention.

FIG. 3 shows another example of the present invention as a one-sided structure of FIG. 2 wherein only one single gear (2) with projecting posts (25) and one contact leg (81) on the rocker (8) are shown, and the cleaning cotton (84) is still inserted in the groove (83) at the front end of rocker (8), but the difference consists in the spring (87) in the recess (86) on the outer side of contact leg (81) of rocker (8). This structure is particularly designed for one-sided use. During to use, the contact leg (81) of rocker (8) pushed and swung by the projecting posts (25) on the gear (2) in keeping with the elastic force of the spring (87) leads to moving the rocker left and right, and the cleaning cotton (84) inserted in the groove (83) can clean the magnetic head of a tape recorder.

The foregoing examples are aimed at describing the present invention but not to limit same, so any modification and change(s) made in line with the spirit and characteristics of the present invention should be included in the scope of claims thereof.

I claim:

1. A cleaner for a magnetic head of a tape recorder having spaced revolving shafts, comprising a tape cartridge provided with at least one cartridge hole positioned and dimensioned to coaxially receive an associated revolving shaft of the tape recorder; at least one generally circular gear arranged within said cartridge and having a gear hole coaxial with an associated cartridge hole during use and dimensioned to engage and rotate with an associated revolving shaft, said at least one gear defining a surface in a plane to one side of said at least one gear; a plurality of posts projecting from said surface and substantially equally spaced from each other along the circumference of said at least one gear; a rocker centrally installed on said cartridge proximate to said at least one gear and mounted for reciprocal movements proximate to the magnetic head; actuating means for engaging successive posts during rotation of said at least one gear and causing said rocker to reciprocate; and a cleaning element arranged on said rocker to reciprocate while in contact with the magnetic head to thereby clean the magnetic head of the tape recorder.

2. A cleaner as defined in claim 1, wherein said tape cartridge is provided with two spaced holes arranged and dimensioned to coaxially receive the two revolving shafts, two generally circular gears being provided and arranged within said cartridge, each gear having a gear hole coaxial with an associated cartridge hole during use and dimensioned to engage and rotate with an associated revolving shaft, and each gear defining a surface in a plane to one side of the gear, and a plurality of posts projecting from said surfaces, said posts on each surface being substantially equally spaced from each other along the circumference of the associated gear, the posts on said two gears being offset on said two gears to cause the posts on said two gears to alternately move into proximity of said actuating means.

3. A cleaner as defined in claim 2, wherein said surfaces on said two gears are substantially coplanar.

4. A cleaner as defined in claim 2, wherein said two gears have gear teeth on the circumferential peripheries thereof which mesh with one another to assure simultaneous rotation of said two gears even if driven by only one revolving shaft.

5. A cleaner as defined in claim 2, wherein said rocker is pivotally mounted; and said actuating means comprises two contact legs secured to said rockers and each projecting into the path of movement of said posts on one of said gears, whereby each of said contact legs alternately contacts the posts of another one of said gears to thereby reciprocate the pivotal movements of said rocker.

6. A cleaner as defined in claim 2, wherein said rocker is slidingly mounted, said rocker having two opposing ends along the direction of sliding movements, contact legs being pivotally mounted on said tape cartridge proximate to each opposing end of said rocker, each contact leg having a first portion coupled to an associated end of said rocker and having a second portion projecting into the path of movement of said posts on one of said gears, whereby each of said contact legs alternately contacts the posts of another one of said gears to reciprocate the sliding movements of said rocker.

7. A cleaner as defined in claim 1, wherein said tape cartridge is provided with one cartridge hole arranged and dimensioned to coaxially receive one revolving shaft, one generally circular gear being provided and arranged within said cartridge, said gear having a hole coaxial with an associated cartridge hole during use and dimensioned to engage and rotate with an associated revolving shaft, said gear defining a surface in a plane to one side of the gear, and a plurality of posts projecting from said surface, said posts on said surface being substantially equally spaced from each other along the circumference of said gear to cause said posts to successively move into proximity of said actuating means.

8. A cleaner as defined in claim 7, wherein said rocker reciprocates between two extreme positions and said actuating means comprises a contact leg having a first portion secured to said rocker and a second portion projecting into the path of movement of said posts on said gear to thereby cause said posts to move said rocker to one extreme position of the reciprocating motion; and biasing means to urge said rocker to revert to the other extreme position of the reciprocating motion.

9. A cleaner as defined in claim 8, wherein said biasing means comprises a spring action between said contact leg and said cartridge.

* * * * *